United States Patent [19]
Murgulescu et al.

[11] 3,859,189
[45] Jan. 7, 1975

[54] POLYMERIZATION OF ACRYLONITRILE USING RADIATION IN THE PRESENCE OF DIMETHYLSULPHOXIDE AND A PROTEIN

[75] Inventors: I. G. Murgulescu; Tatiana Oncescu; I. Vlagiu, all of Bucharest, Romania

[73] Assignee: Central De Chimie Fizica, Bucharest, Romania

[22] Filed: Dec. 18, 1970

[21] Appl. No.: 99,718

Related U.S. Application Data

[63] Continuation-in-part of Ser. No. 30,959, April 22, 1970, Pat. No. 3,736,241.

[30] Foreign Application Priority Data
Dec. 18, 1969 Romania.............................. 61906

[52] U.S. Cl............ 204/159.12, 260/8, 260/85.5 D, 204/159.22
[51] Int. Cl. ......................... C08d 1/00, C08f 1/16
[58] Field of Search.................. 204/159.22, 159.12; 260/85.5 D, 85.5 N

[56] References Cited
UNITED STATES PATENTS

| | | | |
|---|---|---|---|
| 2,932,629 | 4/1960 | Wiley................................ | 260/91.5 |
| 3,574,177 | 4/1971 | Nakajima et al................... | 260/88.7 |
| 3,591,572 | 7/1971 | Stamm et al....................... | 260/92.8 |

*Primary Examiner*—Murray Tillman
*Assistant Examiner*—Richard B. Turer

[57] ABSTRACT

Method of polymerizing acrylonitrile in a field of ionizing radiations, wherein in order to improve the tinctorial properties of the resulting polymer a 1–5 percent aqueous protein solution in 10 cm$^3$ dimethylsulphoxide is slowly added to the reaction medium under continuous stirring and in an inert atmosphere when the conversion has reached about 65 percent. 2 cc of the proteic solution is used for from 6 to 20 parts by weight acrylonitrile.

2 Claims, No Drawings

POLYMERIZATION OF ACRYLONITRILE USING RADIATION IN THE PRESENCE OF DIMETHYLSULPHOXIDE AND A PROTEIN

This application is a continuation-in-part of our copending application Ser. No. 30,959, filed Apr. 22, 1970, now U.S. Pat. No. 3,736,241.

This invention relates to an improved method for the polymerization of acrylonitrile in a field of ionizing radiations.

According to the invention disclosed in the parent application, in order to improve the tinctorial properties, as well as the thermal and coloring stability features of the resulting polymer, the acrylonitrile polymerization is carried out under the ionizing radiation influence, in the presence of oxalic manganese complexes, or fumaric and itaconic acids.

It is known that the standard methods for obtaining dye-sensitive polyacrylonitrilic fibers involve the use with acrylonitrile, which is the main monomer, of two or even three co-monomers such as vinyl acetate, methyl methacrylate, and vinyl toluene. These lead finally to co-polymers with various functional acid or basic groups in their macromolecular chain; these groups confer upon the final product an affinity to basic and acid dyes.

But these methods require special equipments for the comonomers synthesis and its recovery, as well as certain special steps at co-polymerization in order to assure the most uniform distribution of the co-monomers in the macromolecular chain.

This invention overcomes the shove mentioned disadvantages by adding an aqueous protein solution under continuous stirring to the reaction medium in an inert atmosphere. A conversion of about 65 percent is secured.

Two preferred examples of the method in accordance with the invention are given below:

EXAMPLE I

In a reaction cell allowing for uniform irradiation at a dose of $5 \times 10^{19}$ eV/gh. in an argon atmosphere there are introduced 12 p.w. acrylonitrile and 88 p.w. dimethylsulphoxide.

The reaction mixture is irradiated for 6 hours at a temperature of 50°C. The reaction is stopped at a conversion of about 65 percent and to the reaction mixture, 2 cm$^3$ of a 5 percent aqueous proteic solution (albumin) in 10 cm$^3$ dimethylsulfoxide is added by help of a pipette (6 drops/min).

The reaction continues for two more hours, until a co-polymer with about 65,000 molecular weight is obtained. After its precipitation and drying off, the resulting co-polymer can be directly coloured with basic acid or dispersion-dyes.

The direct polymer-dyeing becomes possible owing to the resulting physical homogeneous mixture of polyacrylonitrile and protein.

EXAMPLE II

The procedure is as shown in Example I but using 20 p.w. acrylonitrile and 85 p.w. dimethylsulphoxide, to which after a conversion of about 65 percent there is added a mixture of 2 cm$^3$ of aqueous proteic (gelatin) solution, with 10 cm$^3$ dimethylsulphoxide. After 8 hours of reaction, there results a polymer with a molecular weight of about 60,000. After precipitation and drying off such polymer can easily be colored by means of either acid or basic dyes.

The polymer obtained under these conditions shows a very good thermal stability; thermal degradation of the polymer takes place within the 300° — 600°C-range.

The method according to the invention is advantageous, because by a simple proceeding, without co-polymerization reactions, one obtains polyacrylonitrile with improved tinctorial properties.

We claim:

1. Method for the polymerization of acrylonitrile in a field of ionizing radiation in order to improve the tinctorial properties of the resulting polymer, comprising irradiating the acrylonitrile monomer in dimethylsulphoxide reaction medium with ionizing radiation, slowly adding, when the conversion has reached about 65 percent, 1 to 5 percent aqueous solution of protein in 10 cc dimethylsulphoxide to the reaction medium under continuous stirring and in an inert atmosphere, the proportion used being 2 cc protein solution for from 6 to 20 p.w. acrylonitrile, and continuing the irradiation until a product of improved tinctorial properties is obtained.

2. Method for the polymerization of acrylonitrile according to claim 1, wherein the protein is selected from the group consisting of gelatin and albumin.

* * * * *